H. GOLDSCHMIDT.

METHOD OF PREPARING TINNED SHEET IRON BOXES, &c., FOR DETINNING.

APPLICATION FILED MAR. 4, 1907.

Reissued Nov. 16, 1909.

13,042.

WITNESSES

Chas. F. Clagett

M. E. Stanton

INVENTOR

Hans Goldschmidt

BY

Chas. H. Howe his ATTORNEY

UNITED STATES PATENT OFFICE.

HANS GOLDSCHMIDT, OF ESSEN-ON-THE-RUHR, GERMANY, ASSIGNOR, BY MESNE ASSIGNMENTS, TO GOLDSCHMIDT DETINNING COMPANY, OF JERSEY CITY, NEW JERSEY, A CORPORATION OF NEW JERSEY.

METHOD OF PREPARING TINNED SHEET-IRON BOXES, &c., FOR DETINNING.

13,042. Specification of Reissued Letters Patent. Reissued Nov. 16, 1909.

Original No. 804,530, dated November 14, 1905, Serial No. 243,403. Application for reissue filed March 4, 1907. Serial No. 360,618.

*To all whom it may concern:*

Be it known that I, HANS GOLDSCHMIDT, doctor of chemical science, a subject of the King of Prussia, German Emperor, and resident of Essen-on-the-Ruhr, in the German Empire, have invented new and useful Improvements in Methods of Preparing Tin Sheet-Iron Boxes, &c., for Detinning, of which the following is a specification.

My invention relates to a method of and apparatus for preparing tinned sheet-iron boxes, etc. for the separation of tin therefrom and the regaining of the tin and iron constituents of the boxes. Hitherto only tin scrap has been utilized for the recovery of tin and iron from tinned sheet-iron; and tinned iron boxes themselves have not been utilized as a material from which to recover tin and iron, because it has not been possible to make use of these boxes in their original form. It has heretofore been necessary to compress such boxes by hand or by hammering, and when so compressed or hammered the form of the boxes has been irregular and not suitable for the separation of tin therefrom by detinning processes, because it has not been possible for the detinning medium to reach the surfaces of the boxes equally at all sides.

In practice the following conditions must be present in order that boxes may be utilized in the detinning process: The boxes must be compressed so as to occupy as small a space as possible, and the boxes must be so prepared for detinning that the detinning medium can circulate freely at both sides of the sheets from which the tin is to be removed. These conditions are fulfilled in my present method of preparing tinned sheet-iron boxes, etc. for detinning, which method consists in compressing the boxes to the desired extent, preferably between mechanical surfaces that approach toward and withdraw from each other, and also perforating said boxes either simultaneously with or after compression.

Figure 1:
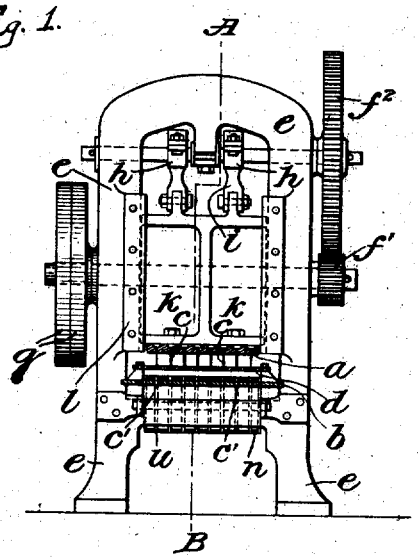
Figure 2:
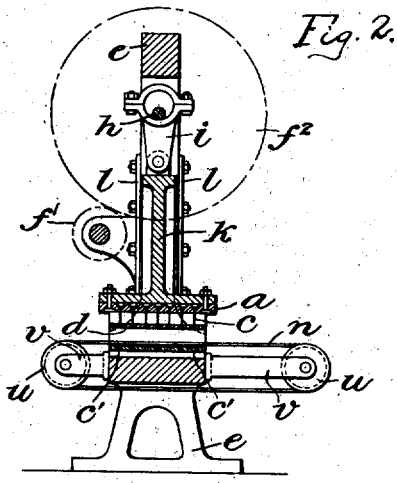
Figure 3:
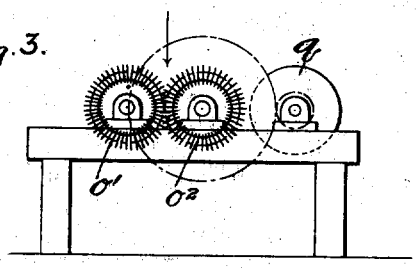
Figure 5:
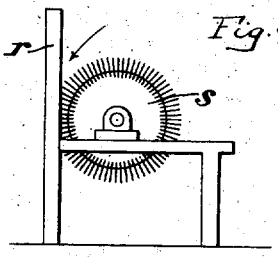
Figure 4:
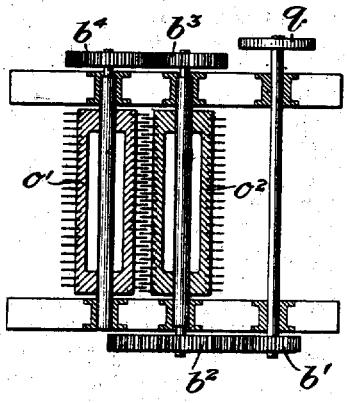
Figure 6:
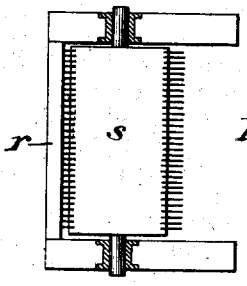

In the drawings, Figure 1 is a front elevation, partly in section, of an apparatus for preparing tinned boxes, etc. for detinning; Fig. 2 is a vertical transverse section of the same, the section being taken in the line A—B, Fig. 1; Fig. 3 is a side elevation of a modification of the invention, illustrating rollers for compressing the boxes by rolling them; Fig. 4 is a horizontal sectional plan of the apparatus shown in Fig. 3; Fig. 5 is a side elevation of another modification of the apparatus embodying my invention, and Fig. 6 is a plan of the same, partly in section.

In the drawings $e$ is the main frame or standard of the apparatus.

$f'$, $f^2$ are a spur pinion and a spur gear in mesh with each other and operated by a pulley $g$ fastened to the shaft carrying the pinion $f'$, said pulley being driven in the usual manner by a belt (not shown).

$h$, $h$, are two eccentrics fastened to the shaft of the spur-gear $f^2$ and controlling the up and down movements of a pair of links $i$. The links $i$ are fastened at their lower ends to a plunger-head $k$ guided in the main frame by means of a pair of guides $l$. The head $k$ carries at its lower end a plate $a$ to which are secured, preferably detachably, devices for compressing and puncturing the tinned boxes or similar material. $b$ is a second plate firmly secured to a bed on the standard $e$, the plate $b$ being parallel to and opposite the plate $a$ and having perforations $c'$ in position to receive the ends of the devices $c$ when these devices are forced down to the proper positions. $d$ is a second plate between $a$ and $b$, with perforations which register with those in the plate $b$. In their uppermost positions the devices $c$ for perforating and compressing the boxes, etc., remain in the perforations in said plate $d$.

$n$ is a belt for feeding the boxes to be compressed, and consists of separate parallel strips arranged in corresponding grooves of rollers $u$ mounted in frames $v$. The belt $n$ must be formed from single strips separated from one another, in order to provide spaces in which the perforators $c$ may work.

The operation of the apparatus just described is as follows: The boxes, etc. for detinning are placed upon the band $n$ and are fed into the space between the plates $b$ and $d$ by turning the rollers $u$. The plate $a$ is then brought down and the boxes are compressed and perforated by means of the devices $c$. The head $k$ is then drawn up, whereupon the plate $d$, which constitutes a stripper, releases the compressed and perforated box or boxes from the upwardly moving devices $c$. The band $n$ then advances and carries the compressed and perforated boxes out of the machine, the boxes so removed being in condition for subsequent detinning and recovery of the iron.

In order to assure the stripping of the compressed perforated boxes from the points of the devices $c$, the plate $d$ may, if desired, also be moved downward toward the plate $b$.

In Fig. 3 I have illustrated a modification in which two rollers $o'$ and $o^2$ have perforators projecting from the surfaces thereof, these rollers being arranged parallel to and near each other, so that in turning the perforators on one roller move between the perforators on the other. These rollers $o'$ and $o^2$ may be driven by a pulley $q$ actuated in any suitable manner, as by a belt (not shown), and this pulley in turn drives a train of gearing $b'$, $b^2$, $b^3$, $b^4$, by means of which the rollers are rotated. The boxes, etc. to be prepared for detinning are dropped from above between the rollers, as indicated by the arrow in Fig. 3, and are seized by the points of the devices $c$ and drawn in between the rollers and compressed and perforated, after which they leave the apparatus at the lower side of the pass between the rollers.

In Figs. 5 and 6 I have illustrated another modification of the apparatus, in which a fixed part or plate $r$ coöperates with a single roller $s$, which roller has perforators projecting from the surface thereof. This roller may be rotated in any suitable manner, and during rotation its points enter and pass through corresponding grooves (not shown) in the plate $r$. The boxes, etc. to be prepared for detinning are placed between the roller $s$ and the plate $r$, as indicated by the arrow in Fig. 5, and are drawn down and compressed and perforated between the roller and the plate, after which they leave the apparatus from the under side of the same.

The various forms of apparatus described illustrate some of the means which may be employed for carrying into effect my present invention, but it should be understood that the apparatus used may be varied in different ways. For example, instead of reciprocating the head $k$ by eccentrics, said head may be raised positively and with it the plate $a$, and then released or dropped, the head $k$ and the plate $a$ in such a construction operating in the manner of a stamp-hammer. The falling of the head and its plate should, however, be so limited as to prevent excessive compression of the boxes; and particularly the boxes should not be compressed to such an extent that the opposing surfaces thereof are in contact with each other, as this will prevent the circulation of the detinning medium along some of the surfaces of the sheets.

What I claim is:

1. A method of preparing tinned boxes, etc., for detinning, consisting in compressing the boxes and also perforating the boxes.

2. A method of preparing tinned boxes, etc., for detinning, consisting in compressing the boxes between mechanically-moved surfaces and perforating the boxes.

3. A method of preparing tinned boxes, etc., for detinning, consisting in simultaneously compressing and perforating the boxes.

4. A method of preparing tinned boxes, etc., for detinning, consisting in rolling the boxes and also perforating the boxes.

5. A method of preparing tinned boxes, etc., for detinning, consisting in simultaneously rolling and perforating the boxes.

HANS GOLDSCHMIDT.

Witnesses:

ALFRED POHLMEYER,
M. ENGELS.